Dec. 27, 1949   R. L. SNELL ET AL   2,492,667
PRODUCTION OF CITRIC ACID BY FERMENTATION
Filed April 12, 1947                    2 Sheets-Sheet 1
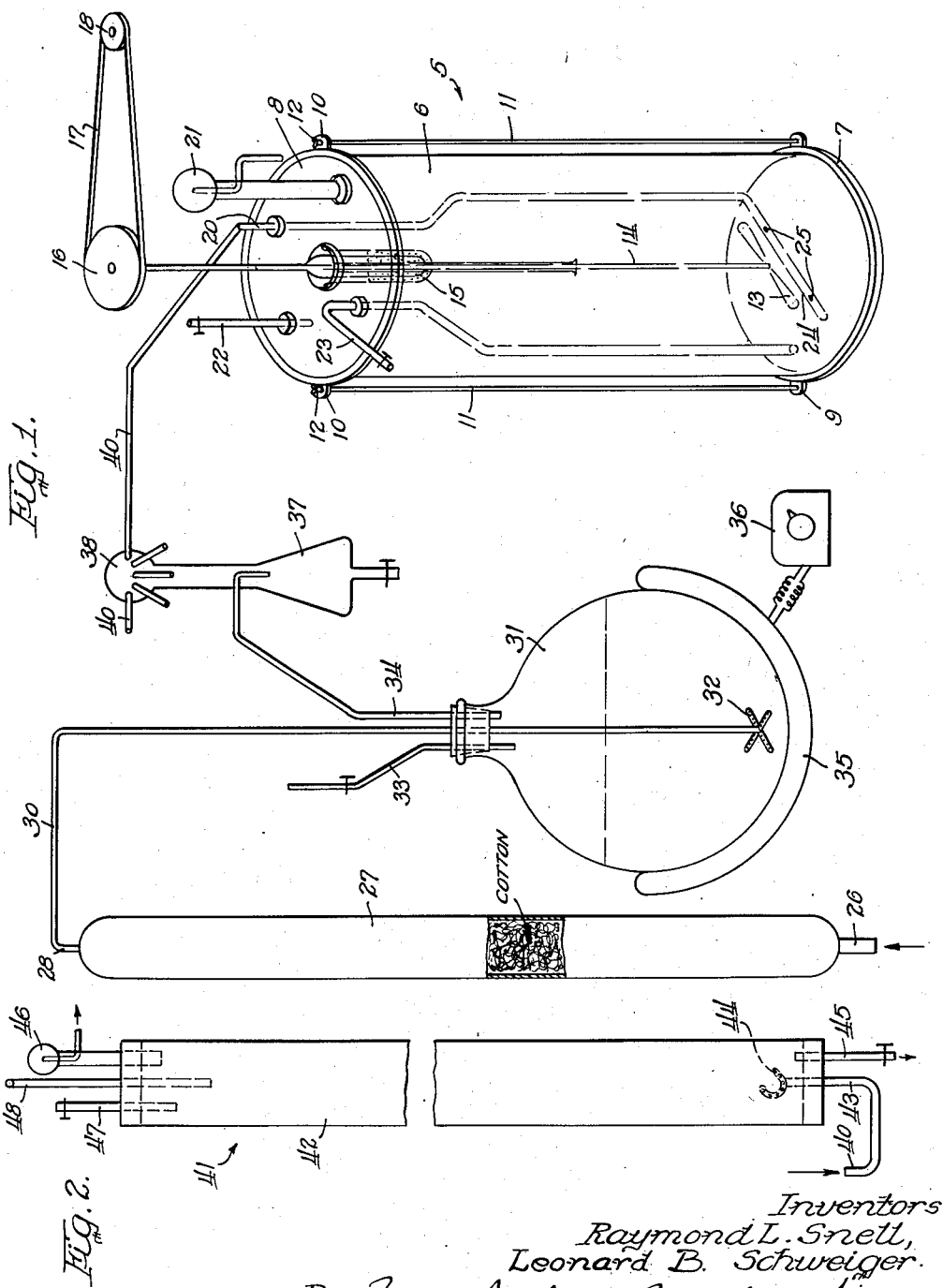
Inventors:
Raymond L. Snell,
Leonard B. Schweiger.
By Brown, Jackson, Boettcher & Dienner
Attys.

Dec. 27, 1949     R. L. SNELL ET AL     2,492,667
PRODUCTION OF CITRIC ACID BY FERMENTATION
Filed April 12, 1947                                2 Sheets-Sheet 2

Fig. 3

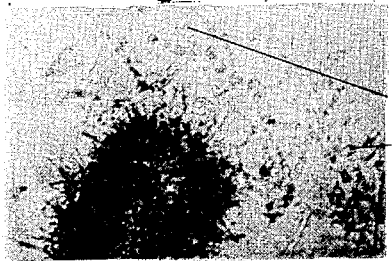

(MAGNIFICATION APPROX. 320X)

Fig. 4

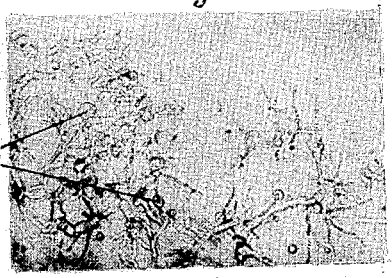

(MAGNIFICATION APPROX. 320X)

SPHERICAL TO OVAL-SHAPED BODIES

Fig. 5

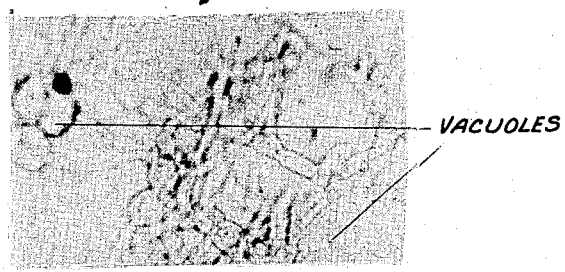

VACUOLES (MAGNIFICATION APPROX. 1800X)

Fig. 6

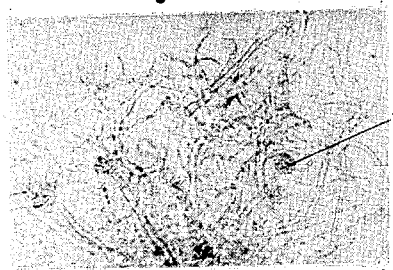

A TYPICAL CELL STRUCTURE DUE TO EXCESSIVE IRON
(MAGNIFICATION APPROX. 320X)

Fig. 7

REPRODUCTIVE CELL

A TYPICAL CELL STRUCTURE DUE TO EXCESSIVE NUTRIENTS
(MAGNIFICATION APPROX. 1800X)

INVENTORS.
Raymond L. Snell,
Leonard B. Schweiger
By Brown, Jackson, Boettcher & Dienner
Att'ys.

Patented Dec. 27, 1949

2,492,667

UNITED STATES PATENT OFFICE 2,492,667

PRODUCTION OF CITRIC ACID BY FERMENTATION

Raymond L. Snell and Leonard B. Schweiger, Elkhart, Ind., assignors to Miles Laboratories, Inc., Elkhart, Ind., a corporation of Indiana Application April 12, 1947, Serial No. 741,108

13 Claims. (Cl. 195—36)

This invention relates, generally, to improvements in the production of citric acid by fermentation. More particularly, the invention relates to improved methods of and apparatus for the production of citric acid by the fermentation of refined, or incompletely refined, carbohydrate-containing material by the growth therein of strains of Aspergillus niger in the submerged state.

The inherent advantages that would attend a commercially successful method of producing citric acid by submerged fermentation, as compared to present surface fermentation methods by which citric acid is now made commercially, are well known to those skilled in the art.

There are two primary requirements which must be met by any satisfactory submerged fermentation process of producing citric acid. Firstly, the process must result in a high conversion of the total original content of the carbohydrate-containing material (e. g. sugar), into citric acid. That is to say, not only must most of the original carbohydrate-containing material be consumed in the process, but also, most of the material so consumed must be converted into citric acid. Specifically, at least 60% of the original content of carbohydrate-containing material in the medium to be fermented, should be converted into citric acid. Secondly, upon completion, the submerged fermentation process must result in a fermented medium containing a relatively high concentration of citric acid (e. g. at least about 7%) with practically no attendant formation of other acids, such as, oxalic and gluconic acids.

In addition to the foregoing primary requisites, a satisfactory submerged fermentation process must be capable of utilizing carbohydrate-containing materials which are commercially available at reasonable prices. Furthermore, such a process must be capable of being carried out on a quantity production basis in practical apparatus.

Briefly, with all the significant factors being taken into consideration, a method of producing citric acid by submerged fermentation, to be successful, must be capable of producing this product at a cost which is at least competitive with, if not lower than, that at which it can now be produced by present methods of surface fermentation.

We are aware of Patent 2,353,771 granted to Szücs on July 18, 1944, and Patent 2,394,031 granted to Waksman and Karow on February 5, 1946.

The object of this invention, generally stated, is the provision of an improved method and apparatus, whereby, citric acid may be produced commercially by submerged fermentation.

An important object of the invention is the provision of a commercial method of producing citric acid by fermenting an incompletely purified carbohydrate-containing material, such as invert molasses or corn starch hydrolysis products, by the growth of strains of A. niger in the submerged state.

Another important object of the invention is the provision of a commercial method of producing citric acid by submerged fermentation of sugar, either refined or incompletely refined as hereinafter specified, wherein at least 60% of the total initial sugar is converted into citric acid without formation of significant quantities of other acids, such as oxalic and gluconic.

Another important object of the invention is the provision of a commercial method of producing citric acid by submerged fermentation of a sugar medium to produce a final concentration of at least about 7.0% citric acid without formation of significant quantities of other acids, such as oxalic and gluconic.

Another important object of the invention is to control the morphological, physiological and cultural characteristics of A. niger in the submerged state by adjustment of the nutrient balance, and its relation to the residual trace element concentrations, whereby the resulting cell structure will be optimum for the fermentation of carbohydrate-containing materials into citric acid in high yields without formation of other acids such as oxalic and gluconic.

An important object of the invention is the provision of a method of producing citric acid by submerged fermentation wherein slime-forming tendencies are eliminated, thus increasing the ease of aeration and subsequent separation of the mold growth from the fermented medium.

Still another object of the invention is the provision of new and improved apparatus for the submerged fermentation of carbohydrate-containing materials to citric acid, which apparatus is of simple design and the utility of which increases as the scale of operations is enlarged.

Another object of the invention is the provision of a fermenter for use in submerged fermentation wherein adequate dispersion of air throughout the fermenting medium is obtained without assistance from a mechanical agitator.

Other objects of the invention will, in part, be obvious and will in part appear hereinafter.

For a more complete understanding of the nature and scope of the invention, reference may be had to the following detailed description thereof taken in connection with the accompanying drawings, wherein:

Figure 1 is a diagrammatic view of one type of appartus wherein citric acid may be produced by submerged fermentation in accordance with the present invention.

Figure 2 is a diagrammatic view of a fermenter column which may be advantageously substituted for the fermenter forming a part of the apparatus shown in Figure 1;

Figures 3, 4 and 5 are photomicrographs illustrating the cellular morphology of A. niger which is typical of that required for production of citric acid by submerged fermentation in accordance with the present invention.

Figures 6 and 7 are photomicrographs illustrating the cellular morphology of A. niger, which is atypical and unsuitable for production of citric acid by submerged fermentation.

ORGANISM AND MORPHOLOGY AS RELATED TO FERMENTATION EFFICIENCY

The organisms which we have employed in our submerged fermentation process were selected mutants and wild strains of A. niger. We have satisfactorily used a wild strain identified as 18B$_2$, and ultra-violet-ray induced mutants (e. g. our numbers 101, 127 and 164) of a strain identified at ATCC #1015. We have obtained good results in submerged fermentation with the above natural or induced variants, which had been found to be capable of giving economic yields of citric acid from carbohydrates when cultivated according to surface fermentation techniques.

The stock cultures were maintained as slant cultures in Sabouraud's agar and stored under refrigeration. Cells were propagated on Sabouraud's agar slants incubated at room temperature for 4 to 7 days prior to use. Serial transfers were made by mass inoculation on a five to seven day cycle. This cycle has been found to give more reproducible fermentation characteristics than older or more irregularly transferred cultures. Inoculation of the fermentation media is made by a spore suspension prepared by washing off a four to seven day old growth from Sabouraud's agar slant with sterile water. A sufficient amount of this suspension is transferred by means of a sterile pipette to produce a final concentration of 5–25 million spores per liter of fermentation medium. This quantity of spores produces an ideal concentration of mycelial aggregates for submerged fermentation.

A mycologist will be able to select and develop other strains of A. niger capable of giving good yields of citric acid in accordance with the present invention.

We have found that by controlling the cellular morphology of the organisms during fermentations, maximum fermentation efficiency is obtained. The morphology which we have found to be typical of, and required for, an efficient citric acid fermentation carried out according to our process (but abnormal with respect to normal cellular morphology) has the following characteristics:

1. Abnormally short, stubby, forked, bulbous, mycelium.

2. Numerous swollen, oval to spherical-shaped cells well distributed throughout the mycelial structure.

3. Mycelial structures all showing granulation, and numerous vacuoles or refractile bodies.

4. Absence of normal reproductive bodies (vesicles or sterigmata).

5. The morphology described in 1 to 4 tends to form compact aggregates or colonies having a granular appearance and of sizes under 0.5 millimeter in cross section and averaging 0.1 mm.

Without exception the type of growth described above, and illustrated by the photomicrographs shown in Figures 3, 4, and 5, is found in submerged fermentations producing high yields of citric acid when our process is followed without deviation. When our process is deviated from low or insignificant citric acid yields result with oxalic acid irregularly present, and paralleled by the atypical cell morphology as described above and illustrated by the photomicrographs shown in Figures 6 and 7.

FERMENTATION MEDIA

In order to obtain satisfactory yields of citric acid by the submerged fermentation process of this invention, it is necessary that a carbohydrate medium be employed which contains a proper nutrient balance. Furthermore, if the carbohydrate is not already refined, it must be given a purification treatment with respect to residual trace element concentrations, particularly iron. However, it is unnecessary to completely refine an impure carbohydrate-containing material in order that it may be satisfactorily used in our process.

A refined sugar, such as beet or cane sugar, can be used as the carbohydrate material. Refined sugar is substantially pure sucrose. Other sugars such as glucose and dextrose may be used. In commercial operations, it will usually be desirable to employ an incompletely refined carbohydrate-containing material which is cheaper than refined sugar. At the present time, invert molasses and corn starch hydrolysis products appear to be the most suitable incompletely refined carbohydrate-containing material which we can use with good results. Other materials that may sometimes be used are: raw sugar juices, beet molasses, citrus molasses, and other carbohydrate containing solutions, preferably of low-ash content.

Invert molasses is an evaporated sugar cane juice that contains all the ash as well as all the original sugar of the juice, most of the sugar being in an inverted form as a result of acid hydrolysis. This product is also known as "high-test molasses" and "Cuban high-test molasses." Typically, invert molasses will weigh about twelve pounds per gallon and will contain about 50% by weight of invert sugar. The sum of the sucrose and invert sugars usually amounts to 70-80%. An important feature of invert molasses in connection with its use as a carbohydrate source in the fermentation process of making citric acid is its relatively low ash content, which usually runs from 1.2 to 2.4% by weight.

Invert molasses, and other similar incompletely refined carbohydrate-containing materials, cannot be satisfactorily fermented to citric acid in accordance with our submerged fermentation process unless given a conditioning or partial purification treatment so as to materially reduce the ash content, and more particularly the Fe concentration. We have found that if the Fe concentration of an incompletely refined carbohydrate-containing material such as molasses, is reduced to, or below, a certain maximum tolerable concentration, the material will also be found to be suitably purified with respect to other ash constituents which it contains. Invert molasses may be conveniently purified with respect to its Fe concentration by the use of cation-exchange resins operating on the hydrogen cycle in accordance with a procedure which will be fully described hereinafter.

Based on a large number of experiments, the following nutrient salts, in the concentrations indicated (per cent by weight) have been found to comprise an unusually favorable medium for the production of citric acid by the submerged fermentation process of this invention. These nutrient salts are added to either refined sugar, or to an incompletely purified carbohydrate-containing material such as corn starch hydrolysis products, or invert molasses which has been de-ionized to reduce the Fe concentration from the usual 100–300 parts per million (P. P. M.) to within the range of 0.3–0.8 P. P. M.

COMPOSITION A

| | Per cent |
|---|---|
| Carbohydrate | 10–15 |
| Ammonium carbonate | 0.2–0.15 |
| $KH_2PO_4$ | 0.01–0.02 |
| $MgSO_4.7H_2O$ | 0.08–0.15 |
| $Zn^{++}$ | 0.002–0.004 |

(pH adjusted to 2.5—zinc added as sulfate or chloride)

We have found that carbohydrate concentrations which are either higher or lower than those included in the above range of 10–15% are usually uneconomical. If the concentrations are higher than 15% the loss of unfermented sugar will be too great. On the other hand, if the concentrations are lower than 10%, impractically high fermentation space will be required. Table 1 below shows the effect of increase in carbohydrate concentration on loss of unfermented sugar:

*Table I*

| Original Sugar Per Cent Conc. | Residual Sugar Per Cent Conc. | Total Grams Acid/100 cc. Medium [1] |
|---|---|---|
| 10 | 0 | 7 |
| 13 | 2 | 7 |
| 15 | 4 | 7.1 |
| 20 | 8 | 7.2 |

[1] Calculated as citric acid. Fermentation time was 12 to 14 days.

We have ascertained that ammonium carbonate is superior to other nitrogen-containing nutrient salts, especially the nitrates, for the following reasons:

1. It suppresses oxalic acid production below limits detectable by qualitative analytical methods.
2. It eliminates pigmentation.
3. It eliminates slime-forming tendencies, thus increasing the ease of aeration and subsequent separation of the mold growth from the fermented medium.
4. It increases the efficiency of citric acid production per unit weight of mycelium.

A large number of experiments have shown the following relative extents of oxalic and citric acid production, and the citric acid producing efficiency of the mycelium when ammonium carbonate was substituted for $NH_4NO_3$ (the customarily employed nitrogen source, expressed as average concentrations of oxalic acid in the fermented medium;

*Table II*

| Nitrogen Source | Oxalic Acid, percent | Grams Citric Acid Produced gram dry mycelium |
|---|---|---|
| $NH_4NO_3$ | 0.03–0.5 | 9–10 |
| Ammonium carbonate | 0.0 | 25–30 |
| $NH_4Cl$ | 0.1–0.5 | |

The reasons for the unexpected superiority of ammonium carbonate as the nitrogen source in our submerged fermentation process are not apparent.

The chemical which is commonly known as ammonium carbonate, i. e., $(NH_4)_2CO_3$, is considered to be a mixture of ammonium bicarbonate and ammonium carbamate (The Merck Index, fifth edition, page 31; Reference Book of Inorganic Chemistry, Latimer and Hildebrand, 1940, page 189).

We have found that it is possible to attain higher fermentation efficiency by restricting the amount of carbohydrate utilized by the organism in producing cellular material, by maintaining the $KH_2PO_4$ concentration within the range of 0.01–0.02%, and preferably at 0.014%. At this latter concentration the most desirable quantity and character of mycelial aggregates are produced in the medium. Table 3 illustrates the effect of varying the concentration of $KH_2PO_4$.

*Table III*

| $KH_2PO_4$, Percent | Conc. Acidity, Percent | Percent Initial Sugar Lost to Mycelium and Metabolic Products Other Than Citric Acid |
|---|---|---|
| 0.05 | 3.14 | 3.24 |
| 0.04 | 3.27 | 1.87 |
| 0.02 | 4.24 | 1.76 |
| 0.01 | 5.59 | 1.00 |

Fermentation time was 11 days.

Increases in $KH_2PO_4$ concentration above 0.05% produce essentially no further increase in sugar utilized by the mycelium. However, concentrations of $KH_2PO_4$ above 0.02% result in increased sugar losses, and inexcessive mycelial production, and increase the viscosity of the mycelial-medium suspension to a point at which aeration becomes inefficient.

We have found that in connection with our submerged fermentation process, a marked increase in $MgSO_4.7H_2O$, over the quantity customarily employed in surface fermentation techniques, results in increased yields, rate, and efficiency of citric acid production, as is illustrated in the following table:

*Table IV*

| $MgSO_4.7H_2O$ | Percent Conversion of Original Sugar | Percent Conversion of Sugar Consumed | Percent Acidity in Medium as Citric Acid |
|---|---|---|---|
| 0.02 | 42.7 | 57.2 | 6.13 |
| 0.04 | 53.0 | 72.2 | 7.41 |
| 0.06 | 56.6 | 72.2 | 7.79 |
| 0.08 | 59.2 | 73.2 | 8.03 |

Fermentation time was 13 days. Initial carbohydrate concentration was 13%.

The most desirable $Zn^{++}$ concentration has been found by us to be within the range of 0.002–0.004%. From the following table it can be seen that concentrations of $Zn^{++}$ higher than 0.004% exert a toxic and repressive effect on growth acid production. On the other hand a minimum $Zn^{++}$ concentration of 0.002% is required to stimulate the production of the abnormal type of cell structure which we have found to be most efficient in citric acid production by submerged fermentation.

*Table V*

| $Zn^{++}$ Conc. Percent | Percent Acidity in Medium |
|---|---|
| 0.0005 | 4.78 |
| 0.002 | 5.61 |
| 0.004 | 4.24 |
| 0.006 | 3.98 |
| 0.008 | 0.32 |

Fermentation time was 10 days.

We have found that, essentially, the most important factor in enabling the organism to acquire the combination of cultural, morphological, and physiological characteristics required for most efficient citric acid production by our process, is the control of the concentration of Fe below 1 P. P. M. The effect of additions of Fe to a refined-sugar-base medium containing the preferred nutrient composition given above for Composition A (which medium before Fe addition contains by analysis less than 0.01 P. P. M. Fe) is shown by the data contained in the following table:

*Table VI*

| Fe Conc. P. P. M. | Acidity as percent Citric | Oxalic Acid, percent |
|---|---|---|
| 0.0 | 5.90 | 0.02 |
| 0.5 | 5.15 | 0.06 |
| 1.0 | 3.89 | 0.06 |
| 3.0 | 2.58 | 0.15 |
| 10.0 | 1.24 | 0.30 |
| 50.0 | 0.52 | ---- |

12 days of fermentation; initial sugar concentration was 13%.

The following table gives representative data when molasses containing varying concentrations of Fe was used in the medium:

*Table VII*

| Fe Conc. P. P. M.[1] | Per cent Acidity |
|---|---|
| 0.95 | 5.56 |
| 2.3 | 3.12 |
| 3.2 | 2.72 |

[1] Fe determined by spectrophotometric analysis. 12 days fermentation.

In comparing that data given in Tables 6 and 7, the Fe concentrations can be correlated directly with the yield. It is apparent that we are able to obtain economical yields of citric acid in our process using molasses which has been given an incomplete purification or de-ionization treatment whereby its Fe concentration is reduced to at least 1 P. P. M. Molasses having Fe concentrations substantially lower than 1 P. P. M. do not give yields of citric acid which are sufficiently higher to warrant the increased cost of such further purification.

APPARATUS

Referring to Figure 1 of the drawings, the reference character 5 designates, generally, a fermenter formed by a cylindrical glass container 6 supported by a stainless steel base plate 7, and provided at the top with a stainless steel cover 8. The top of the container 6 is provided with a gasket. The bottom 7 and cover 8 are each provided with a pair of apertured lugs 9, 9 and 10, 10, respectively, through which extend a pair of tie rods 11, 11. The lower ends of the rods 11, 11 may be provided with bolt heads or otherwise secured to the lugs 9, 9, while the upper ends of the rods 11, 11, are threaded and carry the wing nuts 12, 12. By tightening the wing nuts 12, 12, the bottom 7 and cover 8 may be tightly secured in place on the cylinder 6.

For small operations the fermenter 5 may have a capacity of four liters of medium, with a diameter of six inches and a height of twelve inches. For larger production capacity the size of the fermenters 5 may be suitably increased.

The fermenters should be made, or lined with, a material which is resistant to attack by citric acid in concentrations up to 10%. In particular, the fermenters must be made of, or lined with, a material which will not contaminate the fermenting medium with iron. Either glass lined, rubber lined or resin lined equipment is satisfactory.

In order to agitate the contents of the fermenter 5 and disperse air therethrough, it is provided with a propeller stirrer 13 carried on the bottom of a shaft 14.

The shaft 14 extends up though a mercury seal 15 fitted in a central opening in the cover 8, and at its upper end is provided with a pulley 16. The pulley 16 is connected in driving relationship by a belt 17 to a power take-off pulley 18. It will be understood that the pulley 18 may be mounted on the rotor shaft of an electric motor or other source of power. Satisfactory agitation is obtained when the shaft 14 is rotated at 400–500 R. P. M.

The cover 8 is provided with four additional openings to accommodate an air inlet tube 20, a baffled exhaust air refluxing outlet 21, an antifoam agent inlet connection 22, and a media outlet tube 23. The air inlet tube 20 extends to the bottom of the fermenter 5 and is provided with a fermenter aerator 24 which rests on the bottom and has outlet openings 25, 25 in the top thereof.

In operation, the fermenter 5 requires a supply of sterile, humid air at a rate of from ¼ to 1¼ volume of air per volume of medium per minute, depending upon the size of the fermenter. As the volume of medium is increased, the air flow rate may be reduced toward the lower limit of the range specified.

Compressed air is supplied to the inlet 26 of an air sterilizing tower 27 which is packed with cotton or other suitable mechanical filter. The outlet 28 of the sterilizing tower 27 is connected with a tube 30 which extends through the stoppered inlet of an air humidifier 31. The tube 30 extends to the bottom of the humidifier 31 where it is provided with sparger 32. The humidifier 31 is provided with a sterile water inlet 33 and a humid air outlet 34. In order to maintain the water in the humidifier 31 at a warm temperature, it is provided with an electric heating mantel 35 the temperature of which is regulated by an adjustable rheostat 36. The water within the humidifier 31 is maintained at a temperature sufficient to humidify the air passing therethrough to a 95-100% saturation. Such humidification prevents concentration and cooling of the medium in the fermenter 5 by reason of evaporation, or dilution thereof by condensation.

The humid air outlet 34 leads into a condensate spray trap 37 provided on its top with an air distributing head 38 having a plurality of outlet connections 40. One of the connections 40 leads to the fermenter 5, while the others lead to other fermenters (not shown).

The fermenters 5 of the apparatus shown in Figure 1, may be advantageously replaced with a stationary column type fermenter such as indicated, generally, at 41 in Figure 2. This type of fermenter does not require a mechanical agitator since the aeration obtained with the humidified air supplied thereto through one of the connections 40 is adequate.

The fermenter 41 may be in the form of a glass column 42 having a height which is 16-32 times its diameter. A column 42 having a length of 48-96 inches and a diameter of 3 inches is suitable for small operations. Proportionally larger columns are employed for large scale operations.

Humid, sterile air is supplied through the closed bottom of the fermenter 41 through an air inlet connection 43 connected with one of the connections 40. The air outlet connection is provided with a baffled, exhaust air refluxing outlet 46 and an inlet connection 47 for addition of antifoam agent. A thermometer 48 may be carried in the closed upper end of the column 42. The contents of the fermenter 41 may be drained or sampled through an outlet 45 in the bottom thereof.

As in the case of the fermenters 5 of Figure 1, the fermenters 41 should be supplied with sterile, humid air at a flow rate of from ¼ to 1¼ volume of the air per volume of medium per minute. The lower flow rate is adequate for larger fermenters.

The following specific examples will serve further to indicate the nature of our invention.

EXAMPLE 1

Approximately 2½ gallons of invert molasses of 75-80% carbohydrate content is diluted with tap water or de-ionized water in an amount sufficient to provide a solution having a sugar concentration of 17-19%. This diluted invert molasses may have an Fe concentration of from 100-300 P. P. M. The diluted molasses is passed through a bed of synthetic cation exchange resin operating on the hydrogen cycle so as to produce an effluent containing 16-18% sugar in a solution having a pH of 1.35-1.45, and containing 5-10 P. P. M. Fe. It will be noted that the effluent is diluted somewhat as the result of its passage through said bed of cation exchange resin.

The cation exchange resin may be any one of several which are commercially available. These resins have the ability of exchanging hydrogen ions for cations contained in the molasses solution.

This effluent is next passed through a freshly regenerated bed of the cation exchange resin so as to produce an effluent having a 14-15% sugar content, a pH of 1.4-1.55, and containing less than 1 P. P. M. of Fe. This resulting effluent is next passed through an anion-exchange resin bed to elevate its pH to 2.75-2.90 with partial removal of the anions in exchange for $OH^-$ or $CO_3^{--}$ ions. The resulting molasses, thus partially or incompletely purified, is now ready for the addition of the nutrients of the type and amounts specified above under Composition A.

After receiving the addition of nutrients, the pH of the solution is adjusted finally to 2.5-2.6 by the addition of hydrochloric acid, and the final medium is introduced into ten of the fermenters 5 of the apparatus shown and described in connection with Figure 1. The contents of each fermenter 5 are now sterilized at 10 lbs. gauge pressure for ten minutes and cooled to near room temperature.

In accordance with the procedure described above under organism, the contents of each fermenter 5 are next inoculated with a spore suspension of A. niger so as to provide a final concentration of 5-25 million spores per liter of fermentation medium. Agitation of the contents of each fermenter 5 is initiated with the propeller shafts 14 rotating at 400-500 R. P. M. Simultaneously, sterile, humidified air at atmospheric pressure is introduced into each fermenter at a rate of 0.8-1.0 volume of air/volume of medium/minute. An antifoam agent is added to the medium in each fermenter to eliminate foaming tendencies during the early stages of the fermentation. Additions of antifoam agent are not required during the later stages. The temperature of the medium is maintained at 24-34° C. during the course of the fermentation. Within the first 24 hours initial growth takes place, and within 72 hours active citric acid production occurs and continues until substantially all of the carbohydrate has been consumed. Usually 10-14 days are required for the completion of the fermentation.

When the fermentation is finished, the contents of the fermenters 5 are withdrawn and citric acid is recovered from the solution by precipitating it as an insoluble salt (e. g. calcium citrate) in accordance with known methods.

A number of antifoaming agents have been successfully used to check the foaming tendencies exhibited during the initial phases of the fermentation. It has been found that most vigorous foaming occurs during the period when acid production is being initiated. Successful fermentations show vigorous foaming.

Of the several antifoaming agents used, n-octadecyl alcohol, as a micro-crystalline suspension in mineral oil, has proven very effective in foaming control when used in amounts of 0.25 to 0.5 ml. of a 3% suspension per liter of fermenting medium.

EXAMPLE 2

Refined cane sugar is used to make up a solution having a sugar content of 14-15%. This solution is utilized in place of the de-ionized molasses in Example 1. Otherwise, the process is the same.

EXAMPLE 3

Example 1 is followed up to the point where the nutrified medium is introduced into the fermenter columns 41 shown in Figure 2 of the drawings. These columns 41 will have been previously steam sterilized before being charged with the medium. Sterile, humidified air is admitted to each fermenter 41 at a rate about ¼-1¼ volumes of air/volume of medium/minute. Antifoam agent is added during the early stages of the fermentation as in Example 1.

The submerged fermentations outlined in Examples 1, 2 and 3 result in yields of citric acid amounting to 80-90% of the sugar consumed from the fourth day until the ends of the fermentations, at which times 80-85% of the sugar originally present will have been utilized.

The following table gives representative data for submerged fermentations carried out in the two types of fermenters described above in accordance with the foregoing examples:

Table VIII

| Vessel Type | Ferm. Time, Days | Orig. Sugar Conc., Per Cent | Final Acid Conc., Per Cent | Vol. of Medium | Residual Sugar Conc., Per Cent | Per Cent Conv. of Orig. Sugar | Per Cent Conv. of Sugar Consumed | Oxalic Acid, Per Cent |
|---|---|---|---|---|---|---|---|---|
| REFINED SUGAR MEDIA | | | | | | | | |
| I (Figure 1) [1] | 13 | 13 | 8.03 | 4,000 ml | 2.60 | 59.2 | 73.2 | 0.02 |
| II (Figure 2) [2]: | | | | | | | | |
| 2″ x 24″ [2] | 14 | 14.9 | 5.6 | 770 ml | 3.33 | 38.5 | 48.4 | neg. |
| 3″ x 48″ [1] | 14 | 14.95 | 8.89 | 3.82 l | 3.87 | 56.8 | 79.9 | 0.2 |
| 3″ x 48″ [2] | 14 | 14.90 | 7.49 | 3.86 l | 5.37 | 48.5 | 78.8 | neg. |
| 3″ x 96″ [2] | 14 | 12.1 | 7.07 | 9.50 l | 2.95 | 65.4 | 86.0 | neg. |
| MOLASSES MEDIA | | | | | | | | |
| I (Figure 1) [1] | 12 | 13.0 | 5.6 | 3,000 ml | 4.6 | 44.0 | 67.0 | 0.02 |

[1] NH₄NO₃ used as N source.
[2] Ammonium carbonate used as N source.

Instead of using air for aeration purposes, it will be understood that other oxygen-containing gases may be employed. However, air is much more convenient and cheaper than any other oxygen-containing gas, and there appears to be no material advantage to be gained in using other oxygen-containing gases. However, by the term air as used herein and in the appended claims we intend to include any other oxygen-containing gas which may be used.

What is claimed as new is:

1. In the production of citric acid by submerged fermentation of a nutrified carbohydrate-containing solution by a citric-acid-producing strain of A. niger, the improvement which comprises, controlling the cellular morphology of the organisms during fermentation by means of initial adjustment of the nutrient balance to include ammonium carbonate for providing sufficient nitrogen for cell synthesis and maintenance of the Fe concentration of the solution below 1 P. P. M. thereby inducing cell structure characterized by: (a) abnormally short, stubby, forked, bulbous mycelium; (b) numerous swollen, oval to spherical-shaped cells well distributed throughout the mycelial structure; (c) mycelial structures all showing granulation, and numerous vacuoles or refractile bodies; (d) absence of normal reproductive bodies (vesicles or sterigmata); (e) formation of compact aggregates or colonies having a gross granular appearance and of sizes under 0.5 mm. in cross section and averaging about 0.1 mm.

2. In the production of citric acid by submerged fermentation of a solution of an ash-containing carbohydrate medium by a citric-acid-producing strain of A. niger, the improvement which comprises supplying nitrogen to said solution in the form of ammonium carbonate, and reducing the Fe concentration of said solution to less than 1 P. P. M. prior to fermentation.

3. The improvement called for in claim 2 wherein said solution is invert molasses diluted to a sugar content of 10–15%, and wherein said reduction in Fe concentration is effected by contacting said diluted molasses with cation-exchange resin operating on the hydrogen cycle.

4. In the production of citric acid by submerged fermentation of a carbohydrate-containing material with a citric-acid-producing strain of A. niger, the improvement which comprises supplying nutrient nitrogen sufficient for cell synthesis to said material in the form of ammonium carbonate.

5. In the production of citric acid by the submerged fermentation of a carbohydrate-containing material with a strain of A. niger selected for its ability to produce citric acid, the improvement which comprises: preparing a 10–15% aqueous solution of said material having a Fe concentration below 1 P. P. M; nutrifying said aqueous solution with the following nutrients in the specified ranges of concentrations

|  | Per cent |
|---|---|
| Ammonium carbonate | 0.2 –0.15 |
| KH₂PO₄ | 0.01 –0.02 |
| MgSO₄.7H₂O | 0.08 –0.15 |
| Zn++ | 0.002–0.004 | adjusting the pH of the nutrified solution to about 2.5–2.6; sterilizing the nutrified solution; inoculating the sterilized solution with a spore suspension sufficient to give a concentration of 5–25 million spores per liter of sterilized solution; and, aerating the inoculated solution with humid sterile air while maintaining the temperature of the solution within the range of 24–34° C. so as to ferment it to citric acid.

6. The improvement called for in claim 5 wherein the carbohydrate-containing material is invert molasses the Fe concentration of which has been reduced to below 1 P. P. M. by contact with a cation-exchange resin operation on the hydrogen cycle.

7. The improvement called for in claim 5 wherein the cell structure is characterized by: (a) abnormally short, stubby, forked, bulbous mycelium; (b) numerous swollen, oval to spherical-shaped cells well distributed throughout the mycelial structure; (c) mycelial structures all showing granulation, and numerous vacuoles or refractile bodies; (d) absence of normal reproductive bodies (vesicles or sterigmata); (e) formation of compact aggregates or colonies having a gross granular appearance and of sizes under 0.5 mm. in cross section and averaging about 0.1 mm.

8. The improvement called for in claim 5 wherein foaming is prevented by addition of an anti-foam agent.

9. The improvement called for in claim 5 wherein dispersion of air throughout the fermented medium is assisted by agitation.

10. The improvement called for in claim 5 wherein said fermentation is carried out in a column with the air being introduced into the bottom thereof and affording the aeration and agitation.

11. The improvement called for in claim 5 wherein the rate of flow of humid sterile air is within the range of ¼–1¼ volume of air per volume of medium per minute.

12. The improvement called for in claim 2 wherein said ash-containing carbohydrate medium is corn starch hydrolisate.

13. The improvement called for in claim 5 wherein the carbohydrate-containing material is corn starch hydrolisate.

RAYMOND L. SNELL.
LEONARD B. SCHWEIGER.

REFERENCES CITED

The following references are of record in the file of this patent:

UNITED STATES PATENTS

| Number | Name | Date |
|---|---|---|
| 525,823 | Takamine | Sept. 11, 1894 |
| 628,067 | Bendixin | July 4, 1899 |
| 1,212,656 | Magne | June 16, 1917 |
| 1,740,163 | Edmonds | Dec. 17, 1929 |
| 2,006,036 | May et al. | June 25, 1935 |
| 2,394,031 | Waksman et al. | Feb. 5, 1946 |
| 2,400,143 | Waksman et al. | May 14, 1946 |

OTHER REFERENCES

The Botanical Review vol. 5, April 1939, pages 207 to 211 by Foster.